(12) United States Patent
Wu et al.

(10) Patent No.: US 11,073,683 B2
(45) Date of Patent: Jul. 27, 2021

(54) PROJECTION LENS STRUCTURE

(71) Applicant: SUN YANG OPTICS DEVELOPMENT CO., LTD., Taoyuan (TW)

(72) Inventors: Sheng-Che Wu, Taoyuan (TW); Yu-Hung Chou, Taoyuan (TW); You-Da Chen, Taoyuan (TW)

(73) Assignee: Sun Yang Optics Development Co., Ltd., Taoyuan (TW)

( * ) Notice: Subject to any disclaimer, the term of this patent is extended or adjusted under 35 U.S.C. 154(b) by 183 days.

(21) Appl. No.: 16/527,293

(22) Filed: Jul. 31, 2019

(65) Prior Publication Data
US 2021/0033828 A1  Feb. 4, 2021

(51) Int. Cl.
| | |
|---|---|
| G02B 13/16 | (2006.01) |
| G02B 9/64 | (2006.01) |
| G02B 13/18 | (2006.01) |
| G03B 21/00 | (2006.01) |
| G02B 9/34 | (2006.01) |
| G02B 9/58 | (2006.01) |
| G02B 5/00 | (2006.01) |
| G02B 13/04 | (2006.01) |

(52) U.S. Cl.
CPC .............. *G02B 13/16* (2013.01); *G02B 9/64* (2013.01); *G02B 13/18* (2013.01); *G02B 5/005* (2013.01); *G02B 9/34* (2013.01); *G02B 9/58* (2013.01); *G02B 13/04* (2013.01); *G03B 21/008* (2013.01)

(58) Field of Classification Search
CPC .......... G02B 9/34; G02B 13/18; G02B 13/04; G02B 5/005; G02B 9/58; G03B 21/008

USPC ................ 359/650, 715, 753, 771, 781, 782
See application file for complete search history.

(56) References Cited

U.S. PATENT DOCUMENTS

| | | | | |
|---|---|---|---|---|
| 7,911,707 | B2 * | 3/2011 | Okada .................. | G02B 15/177 359/680 |
| 8,199,419 | B2 * | 6/2012 | Yamamoto ............. | G02B 13/16 359/781 |
| 2007/0229967 | A1 * | 10/2007 | Nagahara ............. | G02B 15/177 359/676 |
| 2008/0304162 | A1 * | 12/2008 | Yamasaki ...... | G02B 15/145523 359/683 |
| 2010/0157444 | A1 * | 6/2010 | Wang ..................... | G02B 13/16 359/716 |
| 2010/0208358 | A1 * | 8/2010 | Minefuji ................ | G02B 13/22 359/682 |
| 2010/0245786 | A1 * | 9/2010 | Sado .............. | G02B 15/145527 359/682 |
| 2014/0029119 | A1 * | 1/2014 | Chou ....................... | G02B 9/04 359/717 |

\* cited by examiner

*Primary Examiner* — Evelyn A Lester
(74) *Attorney, Agent, or Firm* — Rosenberg, Klein & Lee

(57) ABSTRACT

A projection lens structure mainly includes a first group of lenses with a negative dioptric value, a second group of lenses with a positive dioptric value, a third group of lenses with a positive dioptric value and a fourth group of lenses with a negative dioptric value. The first group of lenses further includes at least a first lens and a second lens, of which the first lens ha a plastic aspheric lens in a meniscus shape with a focal length between −25~−80 mm. The second group of lenses further includes at least a third lens. The third group of lenses further includes at least a first doublet with a focal length between 25~80 mm. The fourth group of length further includes at least a group of doublets, a fourth lens and a fifth lens.

10 Claims, 16 Drawing Sheets

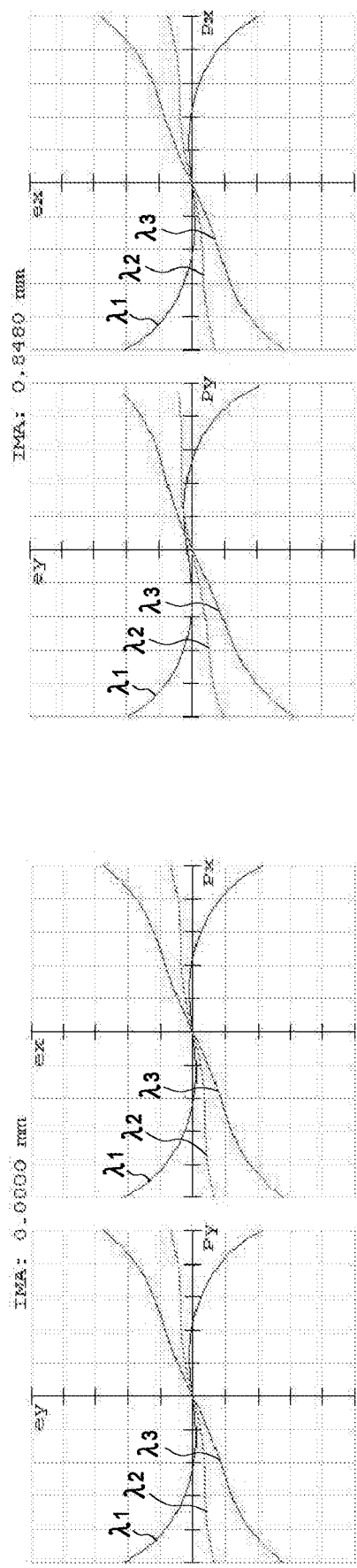
FIG.2B
FIG.2C
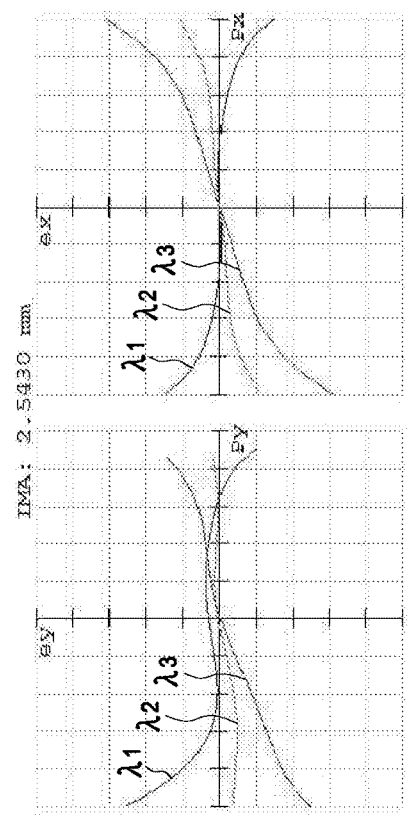
FIG.2D

PROJECTION LENS STRUCTURE

BACKGROUND OF THE INVENTION

1. Field of the Invention

The present invention relates to a projection lens structure, particularly to one that has multiple groups of lenses operated together to manufacture the projection lens with simple structure and low costs.

2. Description of the Related Art

As technologies developed, projectors have been commonly used for displaying clear images. The structures of projectors have also improved to have a plurality of groups of lenses for operation of zooming and focusing. However, the focal lengths of the groups of lenses and the arrangement of the groups of lenses would still affect the quality of the projected images. Therefore, it is desired to come up with a simple structure that is able to display a fine quality of the images with low costs in the manufacturing process.

SUMMARY OF THE INVENTION

A primary objective of the present invention is to provide a projection lens structure that has multiple groups of lenses coordinated in operation to produce images with fine quality by a simple structure and low manufacturing cost.

Another objective of the present invention is to provide a projection lens structure that has multiple groups of lenses operated correspondingly with a large aperture stop to enhance quality of the images.

To achieve the objectives mentioned above, the present invention comprises a first group of lenses including at least a first lens and a second lens with a negative dioptric value, said first lens being a plastic aspheric lens in a meniscus shape with a focal length between −25~−80 mm; a second group of lenses with a positive dioptric value, including at least a third lens; a third group of lenses with a positive dioptric value, including at least a first doublet with a focal length between 25~80 mm; and a fourth group of lenses with a negative dioptric value, including at least a group of doublets, a fourth lens and a fifth lens.

Furthermore, the fourth lens is a positive glass lens; the fifth lens is a positive glass lens; and the group of doublets includes at least one positive glass lens. The group of doublets includes at least a second doublet and a third doublet, both doublets including at least a positive glass lens and the third doublet further having a focal length between −30~−60 mm.

The group of doublets includes at least one triplet lens with a focal length between −30~−40 mm and including at least two negative glass lenses.

In addition, the first group of lenses has an abbe number between 90-140; the second group of lenses has an abbe number between 25-55; the third group of lenses has an abbe number between 50-80; and the fourth group of lenses has an abbe number between 250-330 in total.

The structure further includes an aperture stop disposed between the third and the fourth group of lenses with an f-number between 1.6~2.0. Moreover, the structure conforms to the following prerequisite factors:

$$-2.0 > \frac{f1a}{fw} < -1.1;$$

$$2.0 > \frac{f4}{fw} < 3.2;$$

$$1.48 < \frac{Bf}{fw} < 1.71;$$

where
f1a is an effective focal length of the first group of lenses;
fw is an focal length of the projection system structure under wide-angle mode;
f4 is an effective focal length of the fourth group of lenses; and
Bf is an air-conversion length of back-focus of the projection system structure.

The projection system structure is convertible between wide-angle mode and telescope mode and the first group of lenses arranged as the focusing lenses for the groups of lenses to operate focusing by a digital mirror device. When in wide-angle mode, the first and second groups of lenses are far from the digital mirror device and the third and fourth groups of lenses are close to the digital mirror device; when in telescope mode, the first and second groups of lenses are close to the digital mirror device and the third and fourth groups of lenses are far from the digital mirror device. And the projection system structure has a zoom ratio of 1.0×-1.5×.

With structures disclosed above, the present invention has the first, second, third and fourth groups of lenses operated correspondingly to manufacture a projection lens with simple structure and low cost; meanwhile, the quality of produced images can also be enhanced with the aperture stop arranged between the groups of lenses.

BRIEF DESCRIPTION OF THE DRAWINGS

FIG. 2B is a transverse ray fan plot with an image height of 0.0000 mm under telescope mode according to the first embodiment of the present invention;

FIG. 2C is a transverse ray fan plot with an image height of 0.8480 mm under telescope mode according to the first embodiment of the present invention;

FIG. 2D is a transverse ray fan plot with an image height of 2.5430 mm under telescope mode according to the first embodiment of the present invention;

DETAILED DESCRIPTION OF THE PREFERRED EMBODIMENT

Figure 1A:
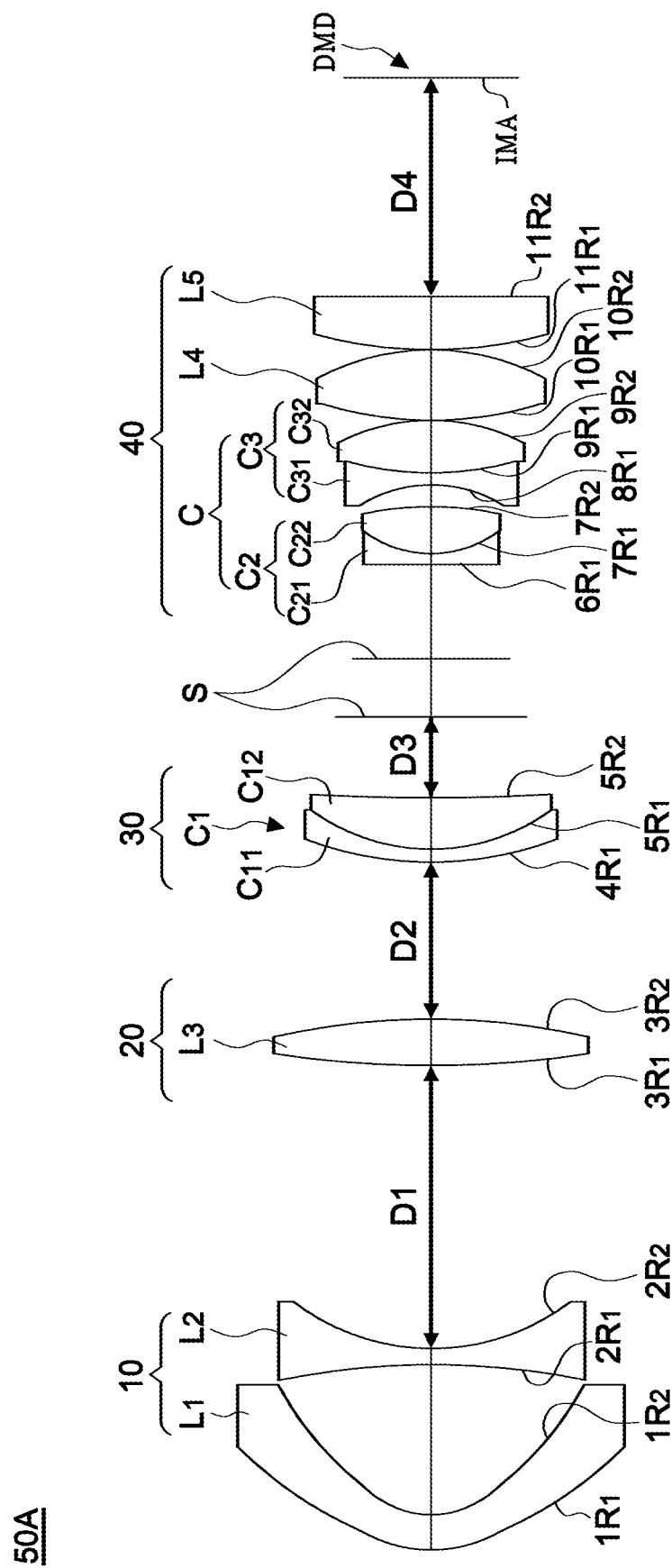
FIG. 1A is a schematic diagram illustrating lenses arrangement of the present invention under wide-angle mode in a first embodiment.
Figure 1C:
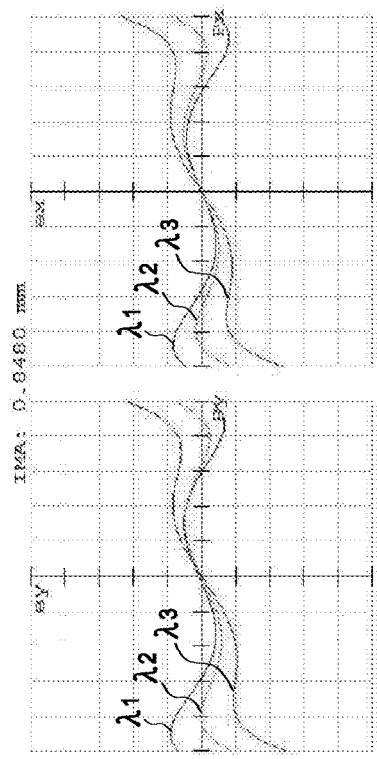
FIG. 1C is a transverse ray fan plot with an image height of 0.8480 mm under wide-angle mode according to the first embodiment of the present invention.
Figure 1D:
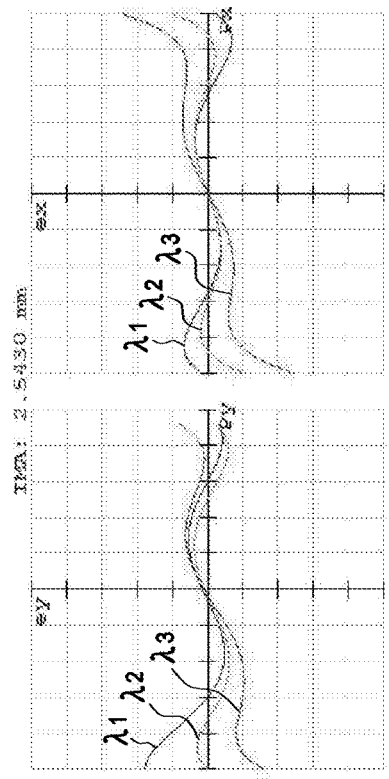
FIG. 1D is a transverse ray fan plot with an image height of 2.5430 mm under wide-angle mode according to the first embodiment of the present invention.
Figure 1B:
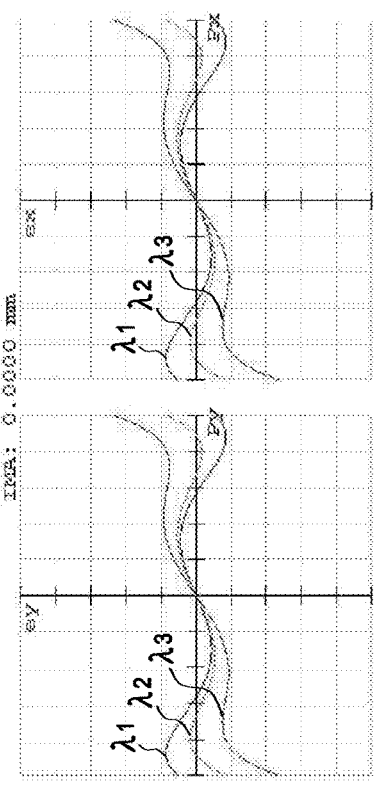
FIG. 1B is a transverse ray fan plot with an image height of 0.0000 mm under wide-angle mode according to the first embodiment of the present invention.
Figure 1F:
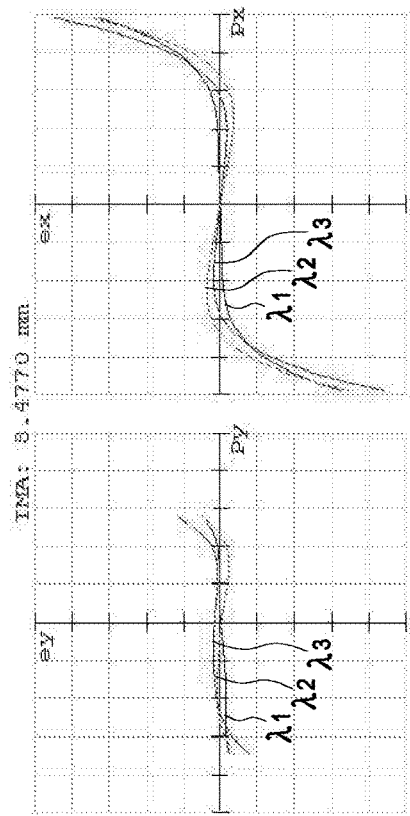
FIG. 1F is a transverse ray fan plot with an image height of 8.4770 mm under wide-angle mode according to the first embodiment of the present invention.
Figure 1E:
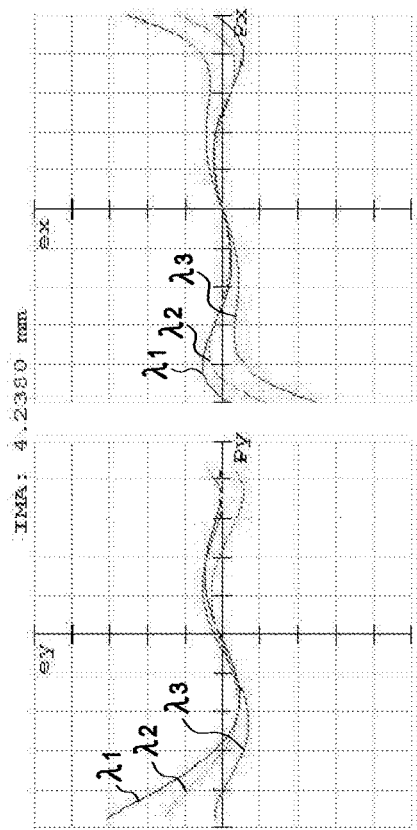
FIG. 1E is a transverse ray fan plot with an image height of 4.2380 mm under wide-angle mode according to the first embodiment of the present invention.

Referring to FIGS. 1A-4H, the present invention is a projection lens structure 50A, 50B, mainly comprising a first group of lenses 10, a second group of lenses 20, a third group of lenses 30, a fourth group of lenses 40 and an aperture stop S.

The first group of lenses 10 includes at least a first lens $L_1$ and a second lens $L_2$ with a negative dioptric value. The first lens $L_1$ is a plastic aspheric lens in a meniscus shape with a focal length between −25~−80 mm. The second group of lenses 20 has a positive dioptric value and includes at least a third lens $L_3$. The third group of lenses 30 has a positive dioptric value and includes at least a first doublet $C_1$ with a focal length between 25~80 mm. The fourth group of lenses 40 has a negative dioptric value and includes at least a group of doublets C, a fourth lens $L_4$ and a fifth lens $L_5$.

In the embodiment, the fourth lens $L_4$ is a positive glass lens; the fifth lens $L_5$ is a positive glass lens; and the group of doublets C includes at least one positive glass lens. The first group of lenses 10 has an abbe number between 90-140; the second group of lenses 20 has an abbe number between 25-55; the third group of lenses 30 has an abbe number between 50-80; and the fourth group of lenses 40 has an abbe number between 250-330 in total. The aperture stop S has an f-number between 1.6~2.0 and is disposed between the third and the fourth group of lenses 30, 40.

Furthermore, the projection lens structure 50A, 50B has the first lens $L_1$, the second lens $L_2$, the third lens $L_3$, the first doublet $C_1$, the group of doublets C, the fourth lens $L_4$ and the fifth lens $L_5$ to be operated by the first, second, third and fourth group of lenses 10, 20, 30, 40 for zooming and focusing. The prerequisite factors of the lenses and the projection lens structure 50A, 50B are as following:

$$-2.0 > \frac{f1a}{fw} < -1.1;$$

$$2.0 > \frac{f4}{fw} < 3.2;$$

$$1.48 < \frac{Bf}{fw} < 1.71;$$

where f1a is an effective focal length of the first group of lenses 10;

fw is an focal length of the projection system structure 50A, 50B under a wide-angle mode;

f4 is an effective focal length of the fourth group of lenses 40; and

Bf is an air-conversion length of back-focus of the projection system structure. But the present invention is not limited to such application.

When the present invention is operated, the structure is converted between a wide-angle mode and a telescope mode and the first group of lenses 10 is arranged as the focusing lenses for the groups of lenses to operate focusing by a digital mirror device DMD. When in the wide-angle mode, the first and second groups of lenses 10, 20 are far from the digital mirror device DMD and the third and fourth groups of lenses 30, 40 are close to the digital mirror device DMD. When in the telescope mode, the first and second groups of lenses 10, 20 are close to the digital mirror device DMD and the third and fourth groups of lenses 30, 40 are far from the digital mirror device DMD. The structure further has a zoom ratio of 1.0×-1.5×. There are two embodiments illustrated here, and both of the embodiments include the features above, but the present invention is not limited to such application.

Referring to FIGS. 1A-2H, in the first embodiment of the present invention, both the second doublet $C_2$ and the third doublet $C_3$ of the group of doublets C include at least one negative glass lens. Further with reference to the following chart, the third doublet $C_3$ has a focal length between $-30 \sim -60$ mm.

| Lenses | Effective focal length (mm) |
|---|---|
| $L_1$ | −55.25 |
| $L_2$ | −31.74 |
| $L_3$ | −60.14 |
| $C_1$ | 50.25 |
| $C_2$ | −836.69 |
| $C_3$ | −42.70 |
| $L_4$ | 35.43 |
| $L_5$ | 53.97 |

Moreover, the first lens $L_1$, the second lens $L_2$, the third lens $L_3$, a sixth lens $C_{11}$ of the first doublet $C_1$, a seventh lens $C_{12}$ of the first doublet $C_1$, an eighth lens $C_{21}$ of the second doublet $C_2$, a ninth lens $C_{22}$ of the second doublet $C_2$, a tenth lens $C_{31}$ of the third doublet $C_3$, an eleventh lens $C_{32}$ of the third doublet $C_3$, the fourth lens $L_4$ and the fifth lens $L_5$ each has a refraction rate and an abbe number, and an abbe number of each group of the lenses 10, 20, 30, 40 is further calculated according to the following specification:

| Lenses | Refraction rate | Abbe number |
|---|---|---|
| $L_1$ | 1.52 | 55.95 |
| $L_2$ | 1.58 | 61.24 |
| 10 | — | 117.2 |
| $L_3$ | 1.77 | 49.61 |
| 20 | — | 49.6 |
| $C_{11}$ | 1.62 | 35.71 |
| $C_{12}$ | 1.81 | 41.02 |
| 30 | — | 76.7 |
| $C_{21}$ | 1.71 | 29.51 |
| $C_{22}$ | 1.49 | 81.59 |
| $C_{31}$ | 1.66 | 33.05 |
| $C_{32}$ | 1.49 | 81.59 |
| $L_4$ | 1.49 | 81.59 |
| $L_5$ | 1.92 | 18.89 |
| 40 | — | 326.2 |

In the table below, the radius, thickness, refraction rate and abbe number of each surface of the lenses are illustrated. In the table, the $1R_1$ is the projecting surface of the first lens $L_1$ and the $1R_2$ is the image inputting surface of the first lens $L_1$; the $2R_1$ is the projecting surface of the second lens $L_2$ and the $2R_2$ is the image inputting surface of the second lens $L_2$; the $3R_1$ is the projecting surface of the third lens $L_3$ and the $3R_2$ is the image inputting surface of the third lens $L_3$; the $4R_1$ is the projecting surface of the first doublet $C_1$; the $5R_1$ is the projecting surface of the first doublet $C_1$; the $5R_2$ is the image inputting surface of the first doublet $C_1$; the $6R_1$ is the projecting surface of the second doublet $C_2$; the $7R_1$ is the projecting surface of the second doublet $C_2$; the $7R_2$ is the image inputting surface of the second doublet $C_2$; the $8R_1$ is the projecting surface of the third doublet $C_3$; the $9R_1$ is the projecting surface of the third doublet $C_3$; the $9R_2$ is the image inputting surface of the third doublet $C_3$; the $10R_1$ is the projecting surface of the fourth lens $L_4$; the $10R_2$ is the image inputting surface of the fourth lens $L_4$; $11R_1$ is the projecting surface of the fifth lens $L_5$ and $11R_2$ is the image inputting surface of the fifth lens $L_5$.

| Surface no. | Radius (mm) | Thickness (mm) | Refraction rate | Abbe number |
|---|---|---|---|---|
| $1R_1$ | 14.04 | 3.00 | 1.52 | 55.95 |
| $1R_2$ | 8.78 | — | — | — |
| $2R_1$ | −81.18 | 1.30 | 1.58 | 61.24 |
| $2R_2$ | 24.60 | — | — | — |
| $3R_1$ | 115.94 | 4.05 | 1.77 | 49.61 |
| $3R_2$ | −77.14 | — | — | — |
| $4R_1$ | 40.27 | 1.10 | 1.62 | 35.71 |
| $5R_1$ | 22.43 | 4.39 | 1.81 | 41.02 |
| $5R_2$ | 201.68 | — | — | — |
| S | Infinity | — | — | — |
| $6R_1$ | Infinity | 1.00 | 1.71 | 29.51 |
| $7R_1$ | 13.34 | 3.97 | 1.49 | 81.59 |
| $7R_2$ | −33.12 | — | — | — |
| $8R_1$ | −15.00 | 1.00 | 1.66 | 33.05 |
| $9R_1$ | 37.07 | 4.48 | 1.49 | 81.59 |
| $9R_2$ | −22.33 | — | — | — |
| $10R_1$ | 44.76 | 5.91 | 1.49 | 81.59 |
| $10R_2$ | −27.92 | — | — | — |
| $11R_1$ | 50.62 | 4.53 | 1.92 | 18.89 |
| $11R_2$ | Infinity | — | — | — |

In addition, the following table displays the radius, the conic value and order aspheric coefficients of the projecting surface $1R_1$ and the image inputting surface $1R_2$ of the second lens $L_1$ as a plastic aspheric lens.

| Aspheric lens | $1R_1$ | $1R_2$ |
|---|---|---|
| Radius | 14.04 | 8.78 |
| Conic | −2.22 | −1.48 |
| 4th | −3.00E−05 | −6.00E−06 |
| 6th | 1.10E−07 | 1.70E−07 |
| 8th | −5.14E−11 | −1.05E−09 |
| 10th | −4.50E−13 | 9.20E−12 |
| 12th | 9.20E−16 | −4.10E−14 |
| 14th | −3.60E−19 | 6.70E−17 |

Furthermore, when the projection system structure 50A switches between the wide-angle mode and the telescope mode, a first distance $D_1$ is arranged between the first and second group of lenses 10, 20, a second distance $D_2$ is arranged between the second and the third group of lenses 20, 30, a third distance $D_3$ is arranged between the third and the fourth group of lenses 30, 40 and a fourth distance $D_4$ is arranged between the fourth group of lenses 40 and the digital mirror device DMD. The distances under different modes are shown in the following table.

| Distance (mm) | Wide-angle mode | 1.1x | Telescope mode |
|---|---|---|---|
| $D_1$ | 24.26 | 21.31 | 19.25 |
| $D_2$ | 13.47 | 7.07 | 1.66 |
| $D_3$ | 6.93 | 8.83 | 10.72 |
| $D_4$ | 18.82 | 20.09 | 21.29 |

The projection system structure 50A can be operated for zooming to 1.2×, and the effective focal lengths of the groups of the lenses 10, 20, 30, 40 conforms to the prerequisite factors:

$$-2.0 > \frac{fla}{fw} < -1.1;$$

$$2.0 > \frac{f4}{fw} < 3.2;$$

$$1.48 < \frac{Bf}{fw} < 1.71;$$

where
fla is an effective focal length of the first group of lenses;
fw is an focal length of the projection system structure under wide-angle mode;
f4 is an effective focal length of the fourth group of lenses; and
Bf is an air-conversion length of back-focus of the projection system structure. In the following table, the effective focal lengths of the groups of the lenses 10, 20, 30, 40 and of the projection system structure 50A under the wide-angle mode are shown.

| Groups of lenses | Wide-angle mode | 1.1x | 1.2x |
|---|---|---|---|
| 10 | −18.28 | −18.28 | −18.28 |
| 20 | 60.51 | 60.51 | 60.51 |
| 30 | 50.6 | 50.6 | 50.6 |
| 40 | 28.71 | 28.71 | 28.71 |
| 50A | 12.61 | 13.87 | 15.12 |
| zooming ratio | — | 1.1 | 1.2 |

Figure 1H:
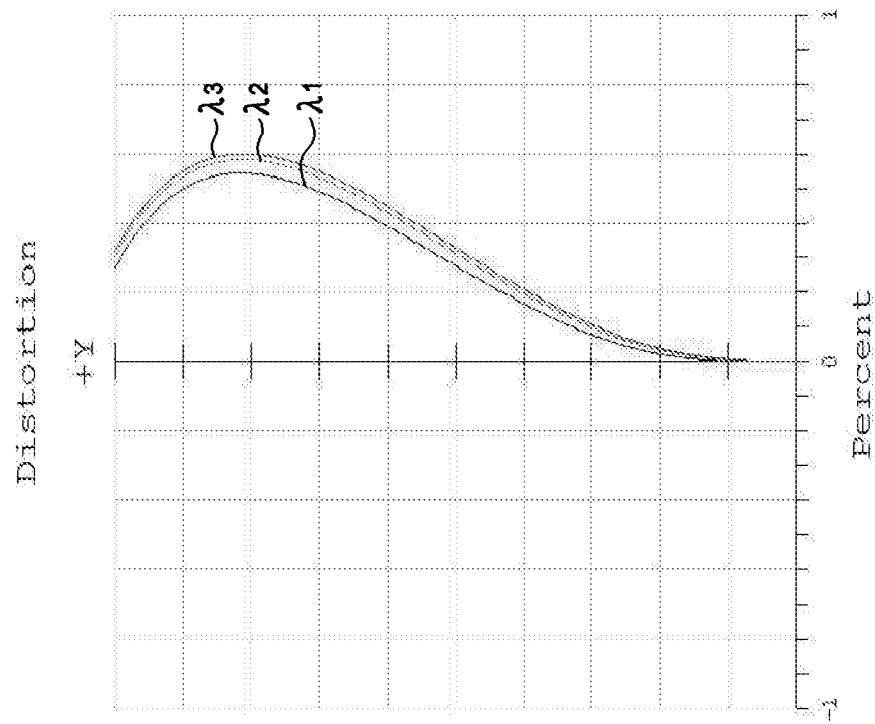
FIG. 1H is a distortion diagram of the present invention under wide-angle mode in the first embodiment.
Figure 1G:
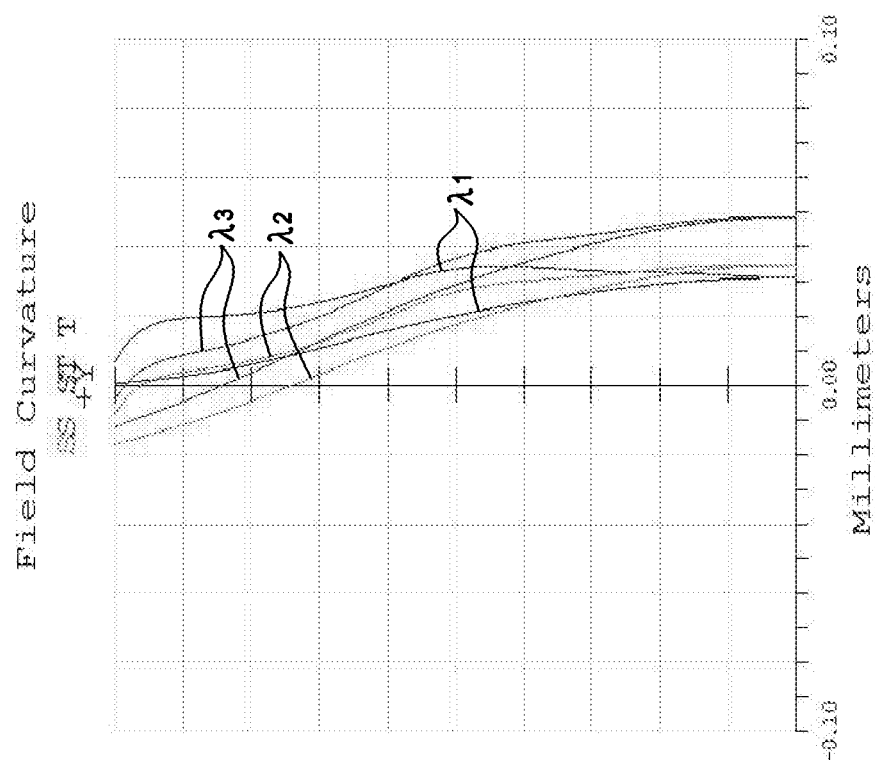
FIG. 1G is a field curvature diagram of the present invention under wide-angle mode in the first embodiment.

As disclosed above, the projection lens 50A under the wide-angle mode has a first wavelength $\lambda_1$ set as 0.486 um, a second wavelength $\lambda_2$ set as 0.588 um and a third wavelength $\lambda_3$ set as 0.656 um; thereby it is able to simulate different transverse ray fan plots as shown in FIGS. 1B-1F and to display images with respective image heights of 0.0000 mm, 0.8480 mm, 2.5430 mm, 4.2380 mm and 8.477 mm on the image IMA. The transverse aberration of a Y-axis is represented by ey. The pupil height of the Y-axis is represented by py. The transverse aberration of an X-axis is represented by ex. The pupil height of the X-axis is represented by px. The maximum of the transverse aberration of the X-axis and the Y-axis is ±20.000 um and the pupil heights of the X-axis and the Y-axis are in normalized proportion; a maximum field of FIGS. 1G and 1H is 33.749°.

Figure 2A:
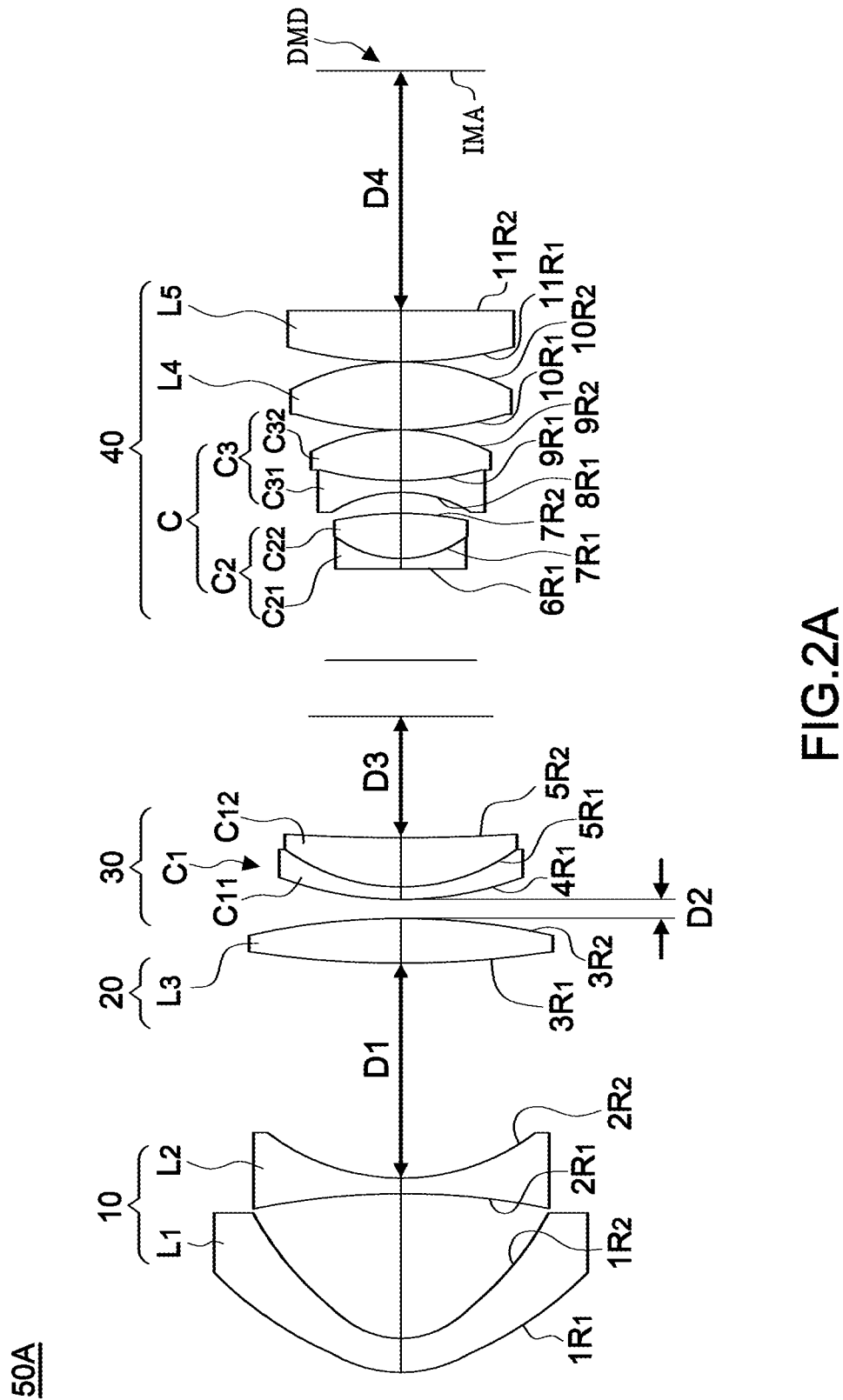
FIG. 2A is a schematic diagram illustrating lenses arrangement of the present invention under telescope mode in a first embodiment.
Figure 2F:
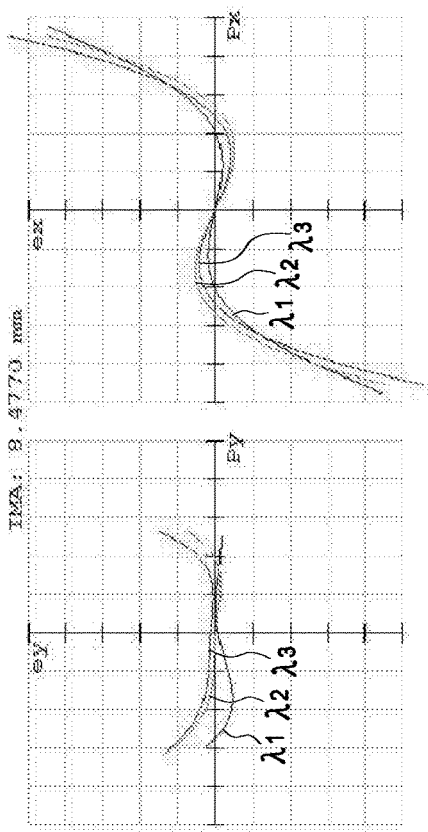
FIG. 2F is a transverse ray fan plot with an image height of 8.4770 mm under telescope mode according to the first embodiment of the present invention.
Figure 2E:
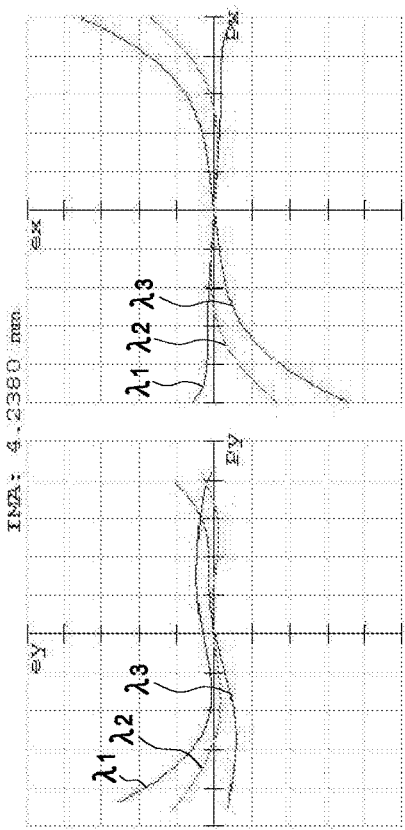
FIG. 2E is a transverse ray fan plot with an image height of 4.2380 mm under telescope mode according to the first embodiment of the present invention.
Figure 2H:
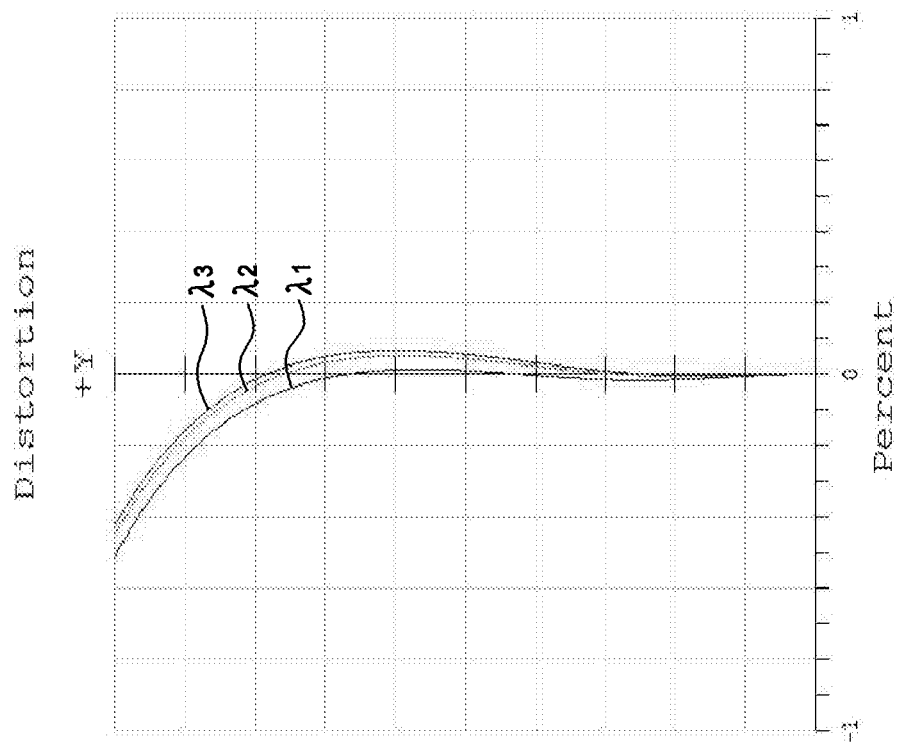
FIG. 2H is a distortion diagram of the present invention under telescope mode in the first embodiment.
Figure 2G:
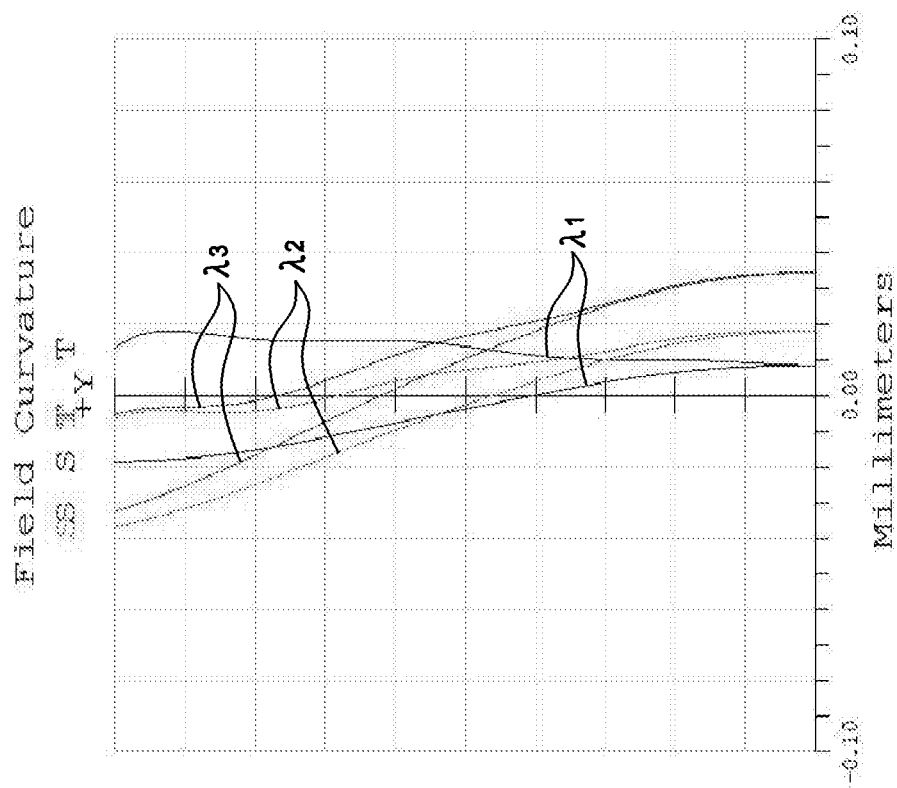
FIG. 2G is a field curvature diagram of the present invention under telescope mode in the first embodiment.

When the projection lens 50A is under the telescope mode, it has a first wavelength $\lambda_1$ set as 0.486 um, a second wavelength $\lambda_2$ set as 0.588 um and a third wavelength $\lambda_3$ set as 0.656 um; thereby it is able to simulate different transverse ray fan plots as shown in FIGS. 2B-2F and to display images with respective image heights of 0.0000 mm, 0.8480 mm, 2.5430 mm, 4.2380 mm and 8.477 mm on the image IMA. The transverse aberration of a Y-axis is represented by ey. The pupil height of the Y-axis is represented by py. The transverse aberration of an X-axis is represented by ex. The pupil height of the X-axis is represented by px. The maximum of the transverse aberration of the X-axis and the Y-axis is ±20.000 um and the pupil heights of the X-axis and the Y-axis are in normalized proportion; a maximum field of FIGS. 2G and 2H is 29.316°.

From the data disclosed above, it is obvious that the present invention has a simple structure with low manufacturing costs but still keeps a fine quality of projection.

Referring to FIGS. 3A-4H, in the second embodiment of the present invention, the group of doublets C includes at least one triplet lens which including at least two negative glass lens. Further with reference to the following chart, the triplet lens has a focal length between −30~−40 mm.

| Lenses | Effective focal length (mm) |
|---|---|
| $L_1$ | −37.55 |
| $L_2$ | −27.81 |
| $L_3$ | 49.64 |
| $C_1$ | 45.84 |
| C | −36.47 |
| $L_4$ | 32.03 |
| $L_5$ | 52.76 |

Moreover, the first lens $L_1$, the second lens $L_2$, the third lens $L_3$, the first doublet $C_1$, a twelfth lens $C_{01}$ of the group of doublets C, a thirteenth lens $C_{02}$ of the group of doublets C, a fourteenth lens $C_{03}$ of the group of doublets C, the fourth lens $L_4$ and the fifth lens $L_5$ each has a refraction rate and an abbe number, and an abbe number of each group of the lenses 10, 20, 30, 40 is further calculated according to the following specification:

| Lenses | Refraction rate | Abbe number |
|---|---|---|
| $L_1$ | 1.52 | 55.95 |
| $L_2$ | 1.64 | 39.67 |
| 10 | — | 95.6 |
| $L_3$ | 1.83 | 42.73 |
| 20 | — | 42.7 |
| $C_{11}$ | 1.80 | 24.97 |
| $C_{12}$ | 1.84 | 33.61 |
| 30 | — | 58.6 |
| $C_{01}$ | 1.75 | 26.42 |
| $C_{02}$ | 1.49 | 81.59 |
| $C_{03}$ | 1.78 | 39.86 |
| $L_4$ | 1.49 | 81.59 |
| $L_5$ | 1.85 | 23.77 |
| 40 | — | 253.2 |

In the table below, the radius, thickness, refraction rate and abbe number of each surface of the lenses are illustrated. In the table, the $1R_1$ is the projecting surface of the first lens $L_1$ and the $1R_2$ is the image inputting surface of the first lens $L_1$; the $2R_1$ is the projecting surface of the second lens $L_2$ and the $2R_2$ is the image inputting surface of the second lens $L_2$; the $3R_1$ is the projecting surface of the third lens $L_3$ and the $3R_2$ is the image inputting surface of the third lens $L_3$; the $4R_1$ is the projecting surface of the first doublet $C_1$; the $5R_1$ is the projecting surface of the first doublet $C_1$; the $5R_2$ is the image inputting surface of the first doublet $C_1$; the $6R_1$ is the projecting surface of the group of doublets C; the $7R_1$ is the projecting surface of the group of doublets C; the $8R_1$ is the projecting surface of the group of doublets C; the $8R_2$ is the image inputting surface of the group of doublets C; the $9R_1$ is the projecting surface of the fourth lens $L_4$; the $9R_2$ is the image inputting surface of the fourth lens $L_4$; $10R_1$ is the projecting surface of the fifth lens $L_5$ and $10R_2$ is the image inputting surface of the fifth lens $L_5$.

| Surface no. | Radius (mm) | Thickness (mm) | Refraction rate | Abbe number |
|---|---|---|---|---|
| $1R_1$ | 14.47 | 3.00 | 1.52 | 55.95 |
| $1R_2$ | 7.75 | — | — | — |
| $2R_1$ | −32.74 | 1.30 | 1.64 | 39.67 |
| $2R_2$ | 39.78 | — | — | — |
| $3R_1$ | 1167.59 | 5.89 | 1.83 | 42.73 |
| $3R_2$ | −42.84 | — | — | — |
| $4R_1$ | 33.19 | 1.50 | 1.80 | 24.97 |
| $5R_1$ | 19.62 | 6.44 | 1.84 | 33.61 |
| $5R_2$ | 175.85 | — | — | — |
| S | Infinity | — | — | — |
| $6R_1$ | −205.62 | 1.00 | 1.75 | 26.42 |
| $7R_1$ | 12.09 | 7.38 | 1.49 | 81.59 |
| $8R_1$ | −10.32 | 3.18 | 1.78 | 39.86 |
| $8R_2$ | −35.13 | — | — | — |
| $9R_1$ | 62.50 | 6.20 | 1.49 | 81.59 |
| $9R_2$ | −20.65 | — | — | — |
| $10R_1$ | 33.32 | 3.32 | 1.85 | 23.77 |
| $10R_2$ | 125.17 | — | — | — |

In addition, the following table displays the radius, the conic value and order aspheric coefficients of the projecting surface $1R_1$ and the image inputting surface $1R_2$ of the second lens $L_1$ as a plastic aspheric lens.

| Aspheric lens | 1R$_1$ | 1R$_2$ |
|---|---|---|
| Radius | 14.47 | 7.75 |
| Conic | −2.87 | −1.46 |
| 4th | −1.80E−05 | 4.90E−05 |
| 6th | 1.14E−07 | 1.25E−07 |
| 8th | −1.14E−10 | −5.93E−10 |
| 10th | −4.09E−13 | 1.20E−11 |
| 12th | 1.38E−15 | −6.51E−14 |
| 14th | −1.20E−18 | 1.49E−16 |

Furthermore, when the projection system structure 50B switches between the wide-angle mode and the telescope mode, a first distance D$_1$ is arranged between the first and second group of lenses 10, 20, a second distance D$_2$ is arranged between the second and the third group of lenses 20, 30, a third distance D$_3$ is arranged between the third and the fourth group of lenses 30, 40 and a fourth distance D$_4$ is arranged between the fourth group of lenses 40 and the digital mirror device DMD. The distances under different modes are shown in the following table.

| Distance (mm) | Wide-angle mode | 1.1x | Telescope mode |
|---|---|---|---|
| D$_1$ | 15.75 | 14.34 | 13.23 |
| D$_2$ | 16.58 | 8.06 | 1.50 |
| D$_3$ | 7.04 | 8.95 | 10.92 |
| D$_4$ | 17.96 | 18.88 | 19.89 |

The projection system structure 50B can be operated for zooming to 1.2×, and the effective focal lengths of the groups of the lenses 10, 20, 30, 40 conforms to the prerequisite factors:

$$-2.0 > \frac{f1a}{fw} < -1.1;$$

$$2.0 > \frac{f4}{fw} < 3.2;$$

$$1.48 < \frac{Bf}{fw} < 1.71;$$

where
f1a is an effective focal length of the first group of lenses;
fw is an focal length of the projection system structure under wide-angle mode;
f4 is an effective focal length of the fourth group of lenses; and
Bf is an air-conversion length of back-focus of the projection system structure. In the following table, the effective focal lengths of the groups of the lenses 10, 20, 30, 40 and of the projection system structure 50A under the wide-angle mode are shown.

| Groups of lenses | Wide-angle mode | 1.1x | 1.2x |
|---|---|---|---|
| 10 | −13.23 | −13.23 | −13.23 |
| 20 | 49.64 | 49.64 | 49.64 |
| 30 | 45.84 | 45.84 | 45.84 |
| 40 | 25.07 | 25.07 | 25.07 |
| 50B | 10.55 | 10.55 | 12.66 |
| zooming ratio | — | 1.0 | 1.2 |

Figure 3A:
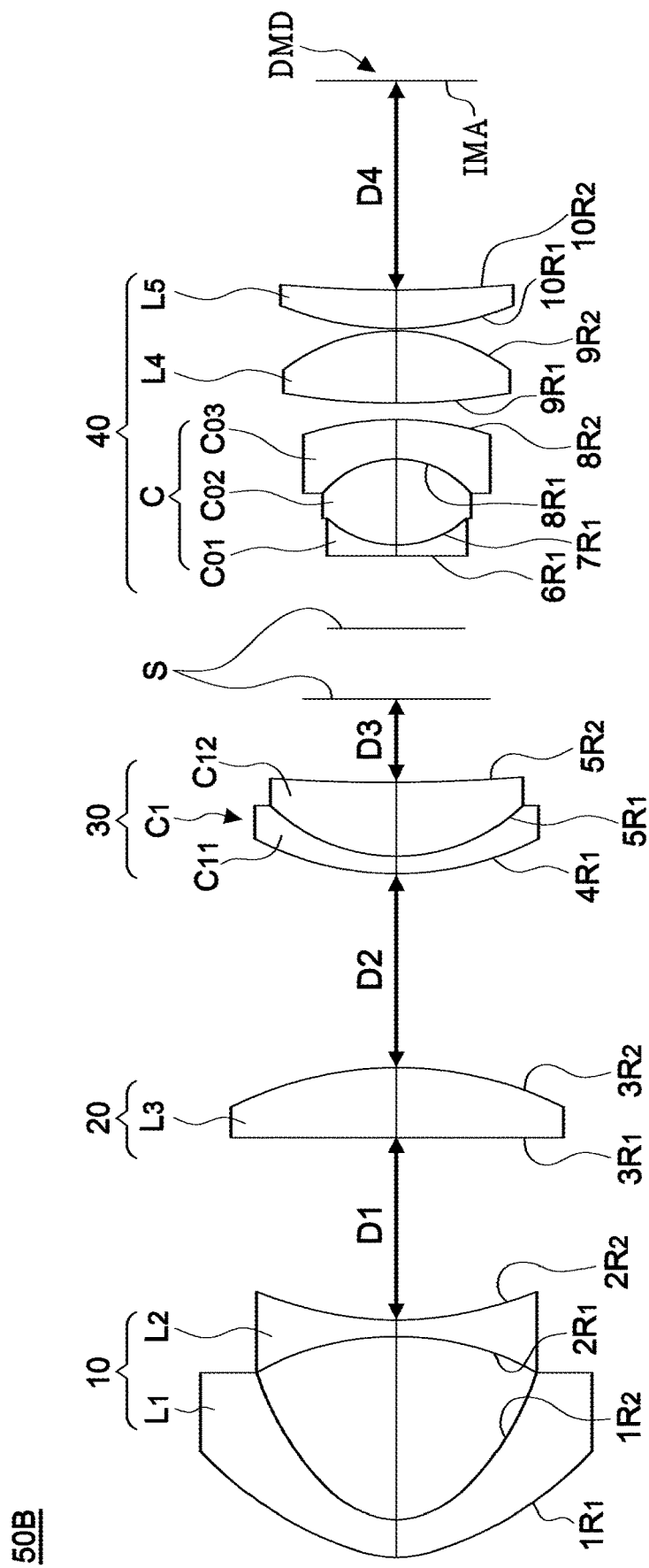
FIG. 3A is a schematic diagram illustrating lenses arrangement of the present invention under wide-angle mode in a second embodiment.
Figure 3C:
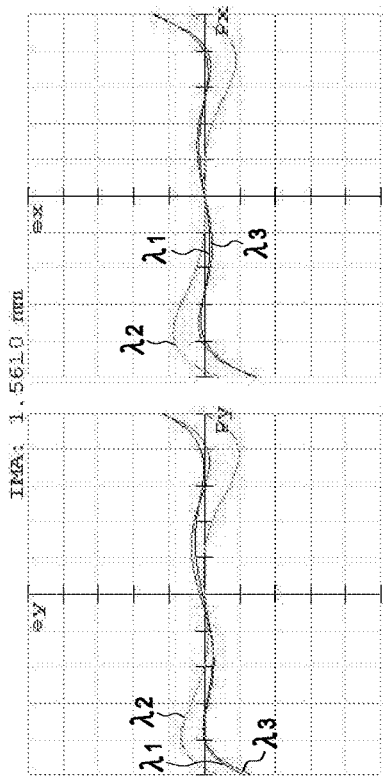
FIG. 3C is a transverse ray fan plot with an image height of 1.5610 mm under wide-angle mode according to the second embodiment of the present invention.
Figure 3B:
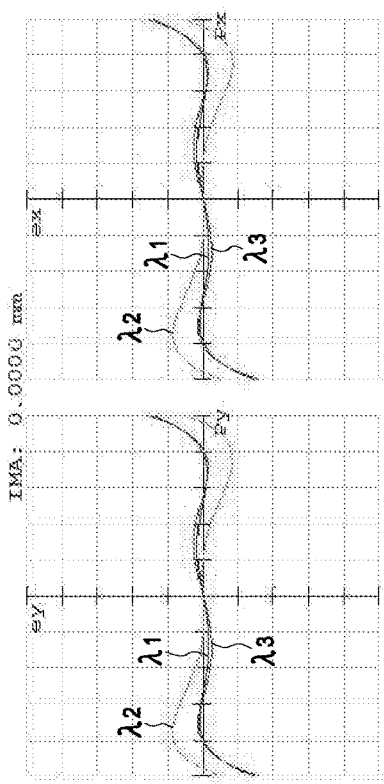
FIG. 3B is a transverse ray fan plot with an image height of 0.0000 mm under wide-angle mode according to the second embodiment of the present invention.
Figure 3D:
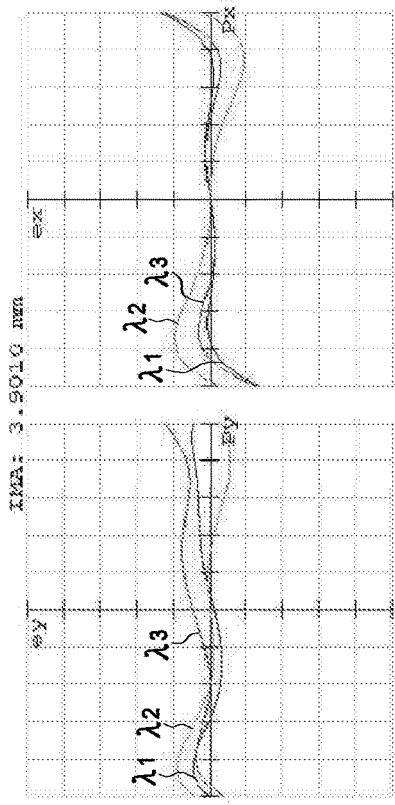
FIG. 3D is a transverse ray fan plot with an image height of 3.9010 mm under wide-angle mode according to the second embodiment of the present invention.
Figure 3F:
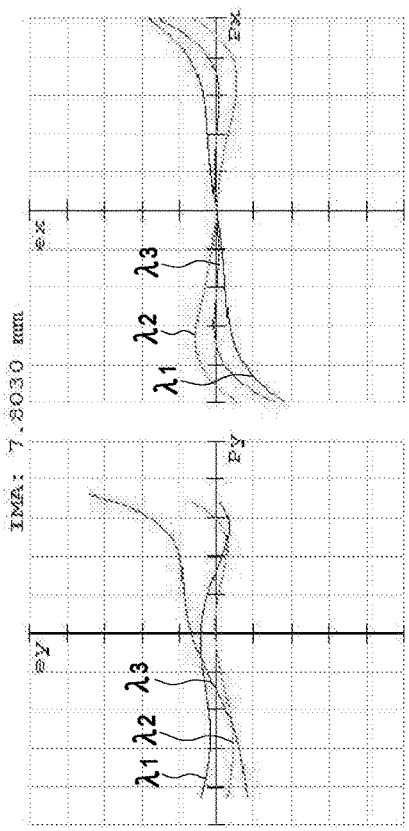
FIG. 3F is a transverse ray fan plot with an image height of 7.8030 mm under wide-angle mode according to the second embodiment of the present invention.
Figure 3E:
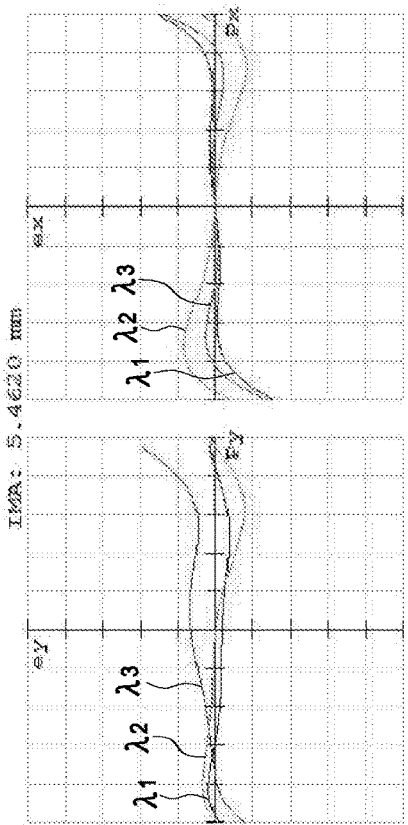
FIG. 3E is a transverse ray fan plot with an image height of 5.4620 mm under wide-angle mode according to the second embodiment of the present invention.
Figure 3H:
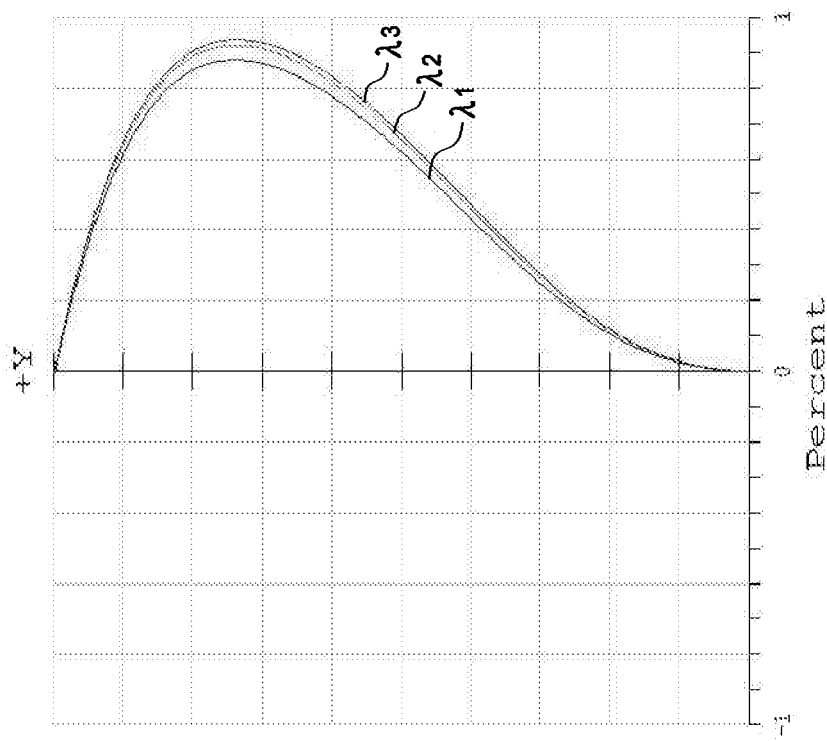
FIG. 3H is a distortion diagram of the present invention under wide-angle mode in the second embodiment.
Figure 3G:
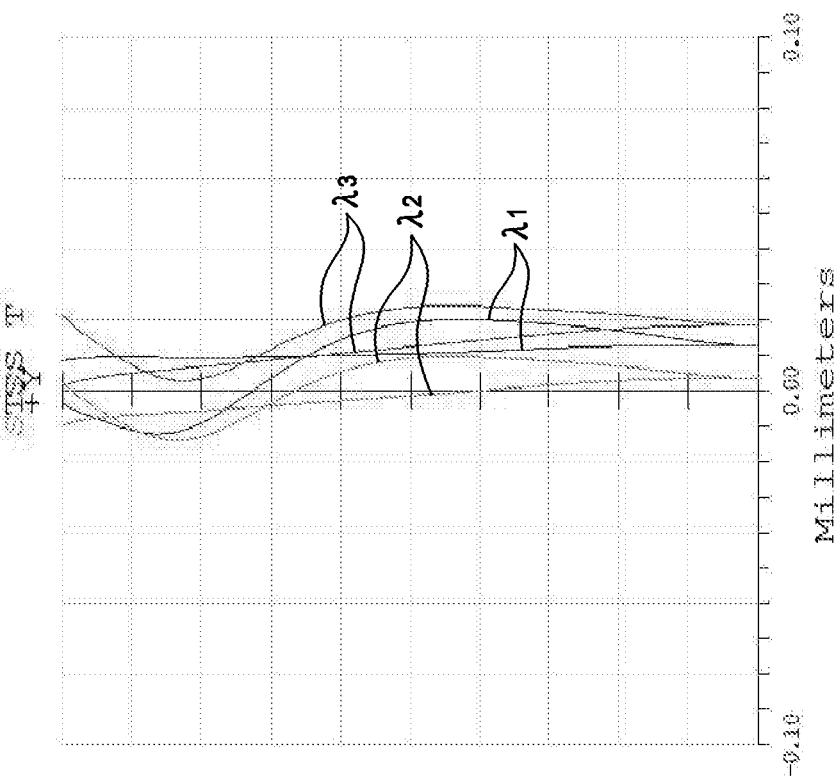
FIG. 3G is a field curvature diagram of the present invention under wide-angle mode in the second embodiment.

As disclosed above, the projection lens 50B under the wide-angle mode has a first wavelength $\lambda_1$ set as 0.486 um, a second wavelength $\lambda_2$ set as 0.588 um and a third wavelength $\lambda_3$ set as 0.656 um; thereby it is able to simulate different transverse ray fan plots as shown in FIGS. 3B-3F and to display images with respective image heights of 0.0000 mm, 1.5610 mm, 3.9010 mm, 5.4620 mm and 7.8030 mm on the image IMA. The transverse aberration of a Y-axis is represented by ey. The pupil height of the Y-axis is represented by py. The transverse aberration of an X-axis is represented by ex. The pupil height of the X-axis is represented by px. The maximum of the transverse aberration of the X-axis and the Y-axis is ±20.000 um and the pupil heights of the X-axis and the Y-axis are in normalized proportion; a maximum field of FIGS. 3G and 3H is 36.362°.

Figure 4A:
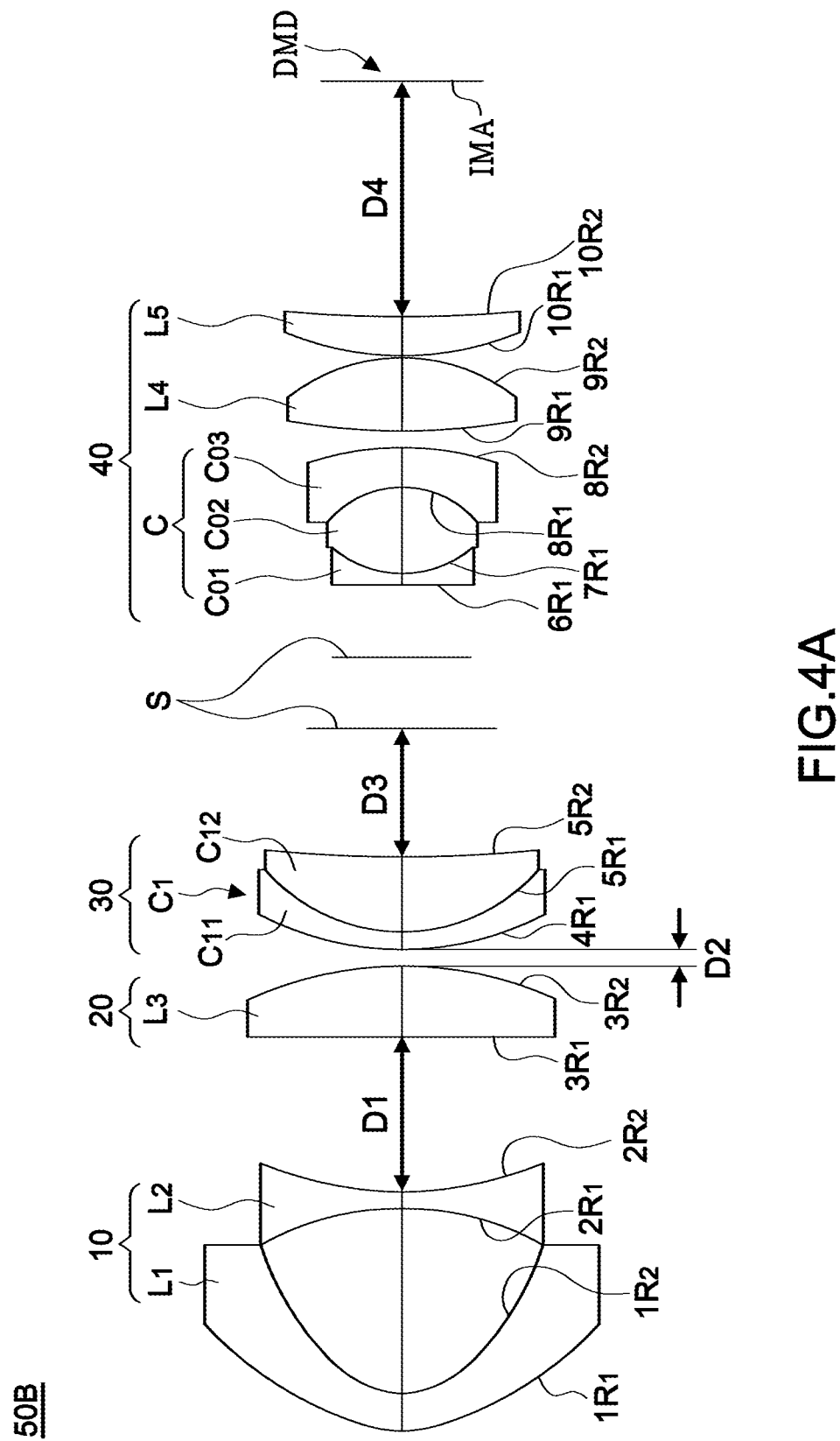
FIG. 4A is a schematic diagram illustrating lenses arrangement of the present invention under telescope mode in a second embodiment.
Figure 4C:
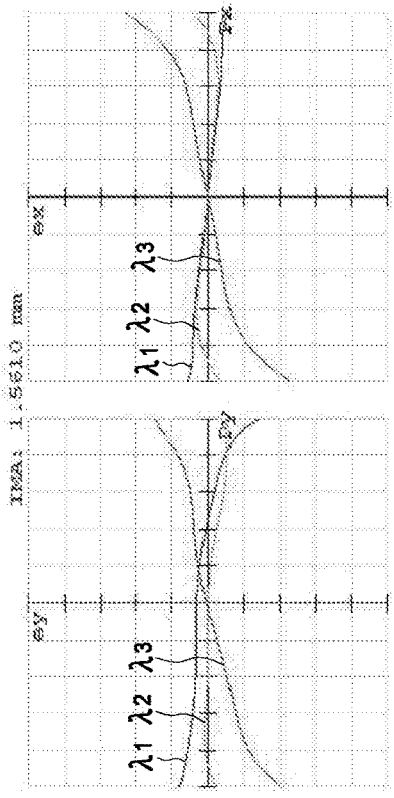
FIG. 4C is a transverse ray fan plot with an image height of 1.5610 mm under telescope mode according to the second embodiment of the present invention.
Figure 4D:
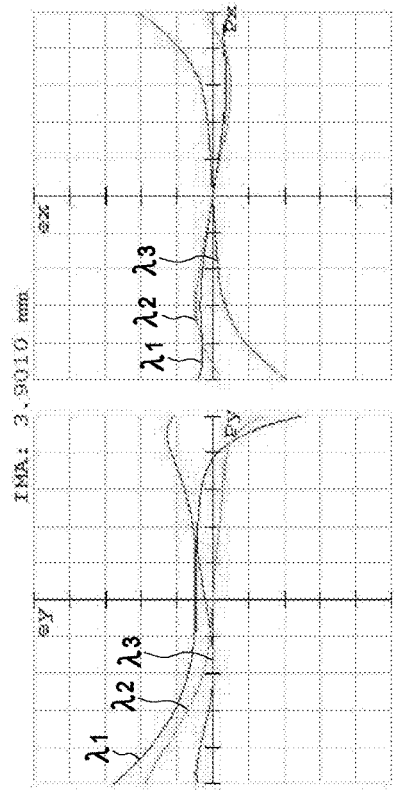
FIG. 4D is a transverse ray fan plot with an image height of 3.9010 mm under telescope mode according to the second embodiment of the present invention.
Figure 4B:
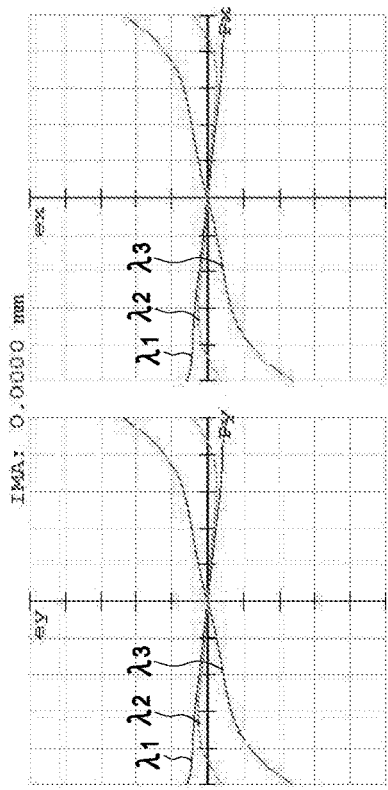
FIG. 4B is a transverse ray fan plot with an image height of 0.0000 mm under telescope mode according to the second embodiment of the present invention.
Figure 4F:
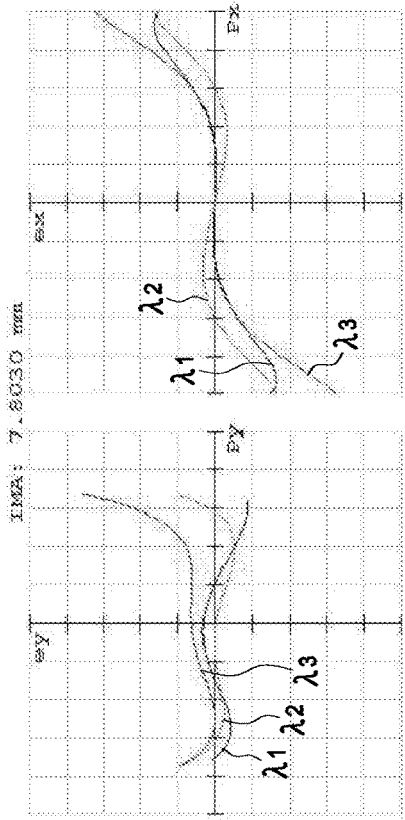
FIG. 4F is a transverse ray fan plot with an image height of 7.8030 mm under telescope mode according to the second embodiment of the present invention.
Figure 4E:
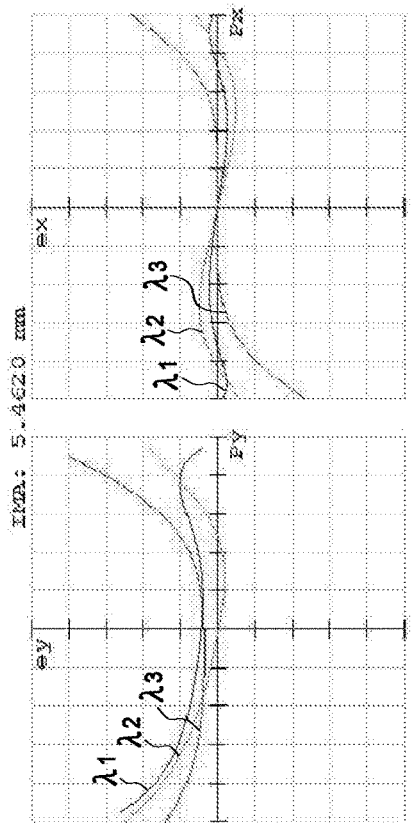
FIG. 4E is a transverse ray fan plot with an image height of 5.4620 mm under telescope mode according to the second embodiment of the present invention.
Figure 4H:
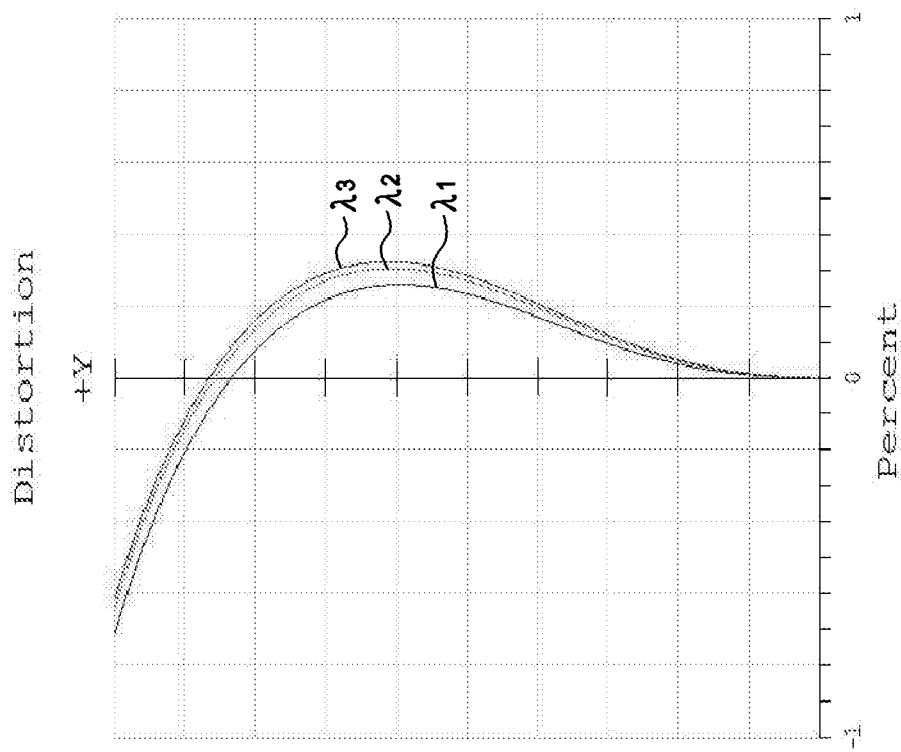
FIG. 4H is a distortion diagram of the present invention under telescope mode in the second embodiment.
Figure 4G:
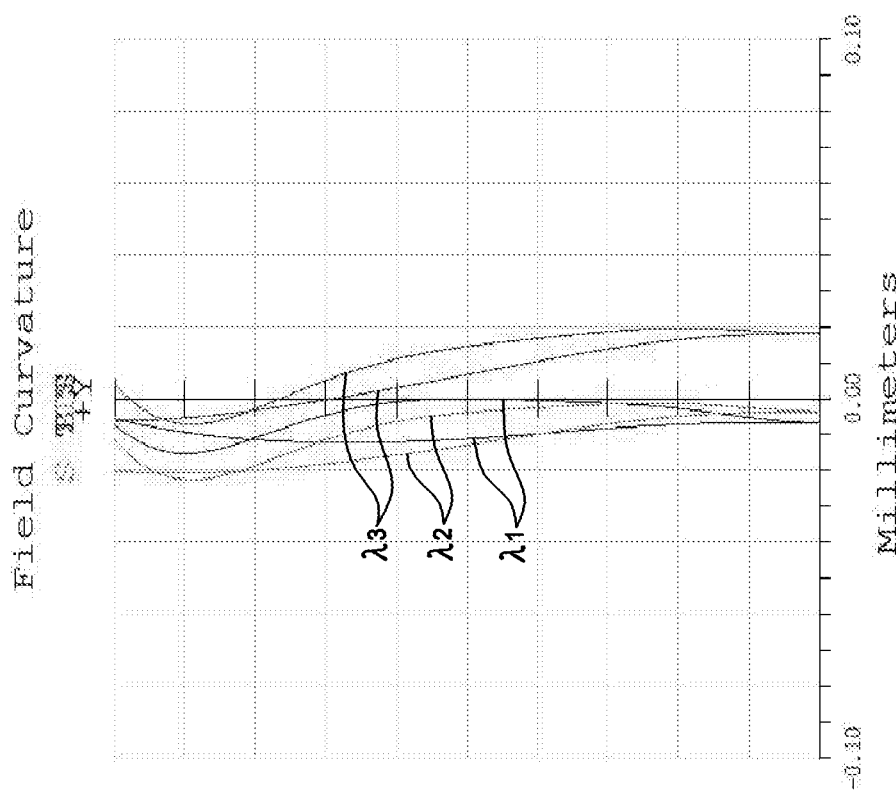
FIG. 4G is a field curvature diagram of the present invention under telescope mode in the second embodiment.

When the projection lens 50B is under the telescope mode, it has a first wavelength $\lambda_1$ set as 0.486 um, a second wavelength $\lambda_2$ set as 0.588 um and a third wavelength $\lambda_3$ set as 0.656 um; thereby it is able to simulate different transverse ray fan plots as shown in FIGS. 4B-4F and to display images with respective image heights of 0.0000 mm, 1.5610 mm, 3.9010 mm, 5.4620 mm and 7.8030 mm on the image IMA. The transverse aberration of a Y-axis is represented by ey. The pupil height of the Y-axis is represented by py. The transverse aberration of an X-axis is represented by ex. The pupil height of the X-axis is represented by px. The maximum of the transverse aberration of the X-axis and the Y-axis is ±20.000 um and the pupil heights of the X-axis and the Y-axis are in normalized proportion; a maximum field of FIGS. 4G and 4H is 31.723°.

Again, from the data disclosed above, it is obvious that the present invention has a simple structure with low manufacturing costs but still keeps a fine quality of projection.

In another embodiment, the present invention can be operated for zooming to 1.3× based on the structure of the first embodiment, and the specification and data are stated in the following tables.

The effective focal length of the lenses:

| Lenses | Effective focal length (mm) |
|---|---|
| L$_1$ | −50.14 |
| L$_2$ | −35.95 |
| L$_3$ | 71.82 |
| C$_1$ | 44.94 |
| C$_2$ | −1250.00 |
| C$_3$ | −38.49 |
| L$_4$ | 34.94 |
| L$_5$ | 51.22 |

The refraction rate and abbe number of the lenses and the abbe number of the groups of lenses 10, 20, 30, 40:

| Lenses | Refraction rate | Abbe number |
|---|---|---|
| L$_1$ | 1.52 | 55.95 |
| L$_2$ | 1.49 | 70.40 |
| 10 | — | 126.4 |
| L$_3$ | 1.80 | 35.00 |
| 20 | — | 35.0 |
| C$_{11}$ | 1.76 | 27.50 |
| C$_{12}$ | 1.81 | 33.30 |
| 30 | — | 60.8 |
| C$_{21}$ | 1.74 | 28.30 |
| C$_{22}$ | 1.49 | 81.59 |
| C$_{31}$ | 1.67 | 32.20 |
| C$_{32}$ | 1.49 | 81.59 |
| L$_4$ | 1.49 | 81.59 |
| L$_5$ | 1.92 | 18.89 |
| 40 | — | 324.2 |

The radius, thickness, refraction rate and abbe number of each surface of the lenses:

| Surface no. | Radius (mm) | Thickness (mm) | Refraction rate | Abbe number |
|---|---|---|---|---|
| 1R$_1$ | 12.59 | 3.00 | 1.52 | 55.95 |
| 1R$_2$ | 7.83 | — | — | — |

-continued

| Surface no. | Radius (mm) | Thickness (mm) | Refraction rate | Abbe number |
|---|---|---|---|---|
| $2R_1$ | −72.53 | 1.50 | 1.48 | 70.40 |
| $2R_2$ | 23.40 | — | — | — |
| $3R_1$ | 115.26 | 3.65 | 1.80 | 34.97 |
| $3R_2$ | −115.26 | — | — | — |
| $4R_1$ | 35.47 | 1.10000 | 1.75 | 27.50 |
| $5R_1$ | 15.80 | 5.14000 | 1.80 | 33.20 |
| $5R_2$ | 311.34 | — | — | — |
| S | Infinity | — | — | — |
| $6R_1$ | 287.48 | 1.00000 | 1.74 | 28.20 |
| $7R_1$ | 13.81 | 3.89000 | 1.49 | 81.59 |
| $7R_2$ | −33.81 | — | — | — |
| $8R_1$ | −15.12 | 1.00000 | 1.67 | 32.10 |
| $9R_1$ | 28.71 | 4.60000 | 1.49 | 81.59 |
| $9R_2$ | −23.30 | — | — | — |
| $10R_1$ | 43.35 | 5.40000 | 1.49 | 81.59 |
| $10R_2$ | −27.95 | — | — | — |
| $11R_1$ | 48.04 | 4.08000 | 1.92 | 18.89 |
| $11R_2$ | Infinity | — | — | — |

The radius, conic value and order aspheric coefficient of the projecting surface $1R_1$ and the image inputting surface $1R_2$:

| Aspheric lens | $1R_1$ | $1R_2$ |
|---|---|---|
| Radius | 12.59 | 7.83 |
| Conic | −2.19 | −1.48 |
| 4th | −2.70E−05 | 1.70E−05 |
| 6th | 1.20E−07 | 1.70E−07 |
| 8th | −7.25E−11 | −1.01E−09 |
| 10th | −4.41E−13 | 9.84E−12 |
| 12th | 1.18E−15 | −4.17E−14 |
| 14th | −8.68E−19 | 7.45E−17 |

The distances $D_1$, $D_2$, $D_3$, $D_4$ between the groups of the lenses 10, 20, 30, 40 under different modes:

| Distance (mm) | Wide-angle mode | 1.1x | 1.2x | Telescope mode |
|---|---|---|---|---|
| $D_1$ | 28.76 | 24.78 | 21.84 | 19.70 |
| $D_2$ | 11.53 | 8.17 | 4.92 | 1.70 |
| $D_3$ | 3.97 | 5.35 | 6.78 | 8.27 |
| $D_4$ | 17.96 | 19.13 | 20.26 | 21.33 |

The effective focal lengths of each group of lenses at different zooming ratio:

| Groups of lenses | Wide-angle mode | 1.1x | 1.2x | 1.3x |
|---|---|---|---|---|
| 10 | −18.28 | −18.28 | −18.28 | −18.28 |
| 20 | 71.82 | 71.82 | 71.82 | 71.82 |
| 30 | 44.94 | 44.94 | 44.94 | 44.94 |
| 40 | 28.64 | 28.64 | 28.64 | 28.64 |
| 50B | 10.58 | 11.64 | 12.7 | 13.76 |
| zooming ratio | — | 1.0 | 1.2 | 1.3 |

In another embodiment, the present invention can be operated for zooming to 1.4x based on the structure of the first embodiment, and the specification and data are stated in the following tables.

The effective focal length of the lenses:

| Lenses | Effective focal length (mm) |
|---|---|
| $L_1$ | −52.86 |
| $L_2$ | −40.35 |
| $L_3$ | 64.17 |
| $C_1$ | 55.26 |
| $C_2$ | −270.87 |
| $C_3$ | −46.75 |
| $L_4$ | 35.35 |
| $L_5$ | 53.80 |

The refraction rate and abbe number of the lenses and the abbe number of the groups of lenses 10, 20, 30, 40:

| Lenses | Refraction rate | Abbe number |
|---|---|---|
| $L_1$ | 1.52 | 55.95 |
| $L_2$ | 1.49 | 81.59 |
| 10 | — | 137.5 |
| $L_3$ | 1.85 | 30.10 |
| 20 | — | 30.1 |
| $C_{11}$ | 1.81 | 25.50 |
| $C_{12}$ | 1.85 | 30.10 |
| 30 | — | 55.6 |
| $C_{21}$ | 1.76 | 27.50 |
| $C_{22}$ | 1.49 | 81.59 |
| $C_{31}$ | 1.65 | 33.80 |
| $C_{32}$ | 1.49 | 81.59 |
| $L_4$ | 1.49 | 81.59 |
| $L_5$ | 1.92 | 18.89 |
| 40 | — | 325.0 |

The radius, thickness, refraction rate and abbe number of each surface of the lenses:

| Surface no. | Radius (mm) | Thickness (mm) | Refraction rate | Abbe number |
|---|---|---|---|---|
| $1R_1$ | 12.45 | 3.00 | 1.52 | 55.95 |
| $1R_2$ | 7.89 | — | — | — |
| $2R_1$ | −475.04 | 1.50 | 1.49 | 81.59 |
| $2R_2$ | 21.04 | — | — | — |
| $3R_1$ | 55.12 | 2.60 | 1.86 | 30.10 |
| $3R_2$ | Infinity | — | — | — |
| $4R_1$ | 43.38 | 1.00 | 1.81 | 25.50 |
| $5R_1$ | 14.98 | 4.75 | 1.85 | 30.10 |
| $5R_2$ | 223.62 | — | — | — |
| S | Infinity | — | — | — |
| $6R_1$ | Infinity | 0.80 | 1.76 | 27.50 |
| $7R_1$ | 13.95 | 4.00 | 1.49 | 81.59 |
| $7R_2$ | −34.30 | — | — | — |
| $8R_1$ | −14.52 | 0.80 | 1.65 | 33.80 |
| $9R_1$ | 35.41 | 4.65 | 1.49 | 81.59 |
| $9R_2$ | −20.87 | — | — | — |
| $10R_1$ | 45.20 | 5.82 | 1.49 | 81.59 |
| $10R_2$ | −27.67 | — | — | — |
| $11R_1$ | 42.99 | 2.75 | 1.92 | 18.89 |
| $11R_2$ | 281.18 | — | — | — |

The radius, conic value and order aspheric coefficient of the projecting surface $1R_1$ and the image inputting surface $1R_2$:

| Aspheric lens | $1R_1$ | $1R_2$ |
|---|---|---|
| Radius | 12.45 | 7.89 |
| Conic | −1.74 | −1.54 |
| 4th | −5.70E−05 | 1.60E−05 |
| 6th | 2.00E−07 | 1.60E−08 |
| 8th | −2.10E−10 | −2.70E−10 |
| 10th | −2.72E−13 | 8.16E−12 |
| 12th | 8.33E−16 | −4.13E−14 |
| 14th | −4.91E−19 | 6.59E−17 |

The distances $D_1$, $D_2$, $D_3$, $D_4$ between the groups of the lenses 10, 20, 30, 40 under different modes:

| Distance (mm) | Wide-angle mode | 1.1x | 1.2x | 1.3x | Telescope mode |
|---|---|---|---|---|---|
| $D_1$ | 39.22 | 33.34 | 28.90 | 25.21 | 22.47 |
| $D_2$ | 7.18 | 6.22 | 4.49 | 2.78 | 0.50 |
| $D_3$ | 5.43 | 6.59 | 8.01 | 9.45 | 11.08 |
| $D_4$ | 17.68 | 19.02 | 20.18 | 21.42 | 22.50 |

The effective focal lengths of each group of lenses at different zooming ratio:

| Groups of lenses | Wide-angle mode | 1.1x | 1.2x | 1.3x | 1.4x |
|---|---|---|---|---|---|
| 10 | −20.81 | −20.81 | −20.81 | −20.81 | −20.81 |
| 20 | 64.83 | 64.83 | 64.83 | 64.83 | 64.83 |
| 30 | 55.63 | 55.63 | 55.63 | 55.63 | 55.63 |
| 40 | 32.54 | 33.33 | 34.34 | 35.44 | 36.78 |
| 50B | 10.56 | 11.62 | 12.67 | 13.73 | 14.78 |
| zooming ratio | — | 1.0 | 1.2 | 1.3 | 1.4 |

In another embodiment, the present invention can be operated for zooming to 1.5× based on the structure of the first embodiment, and the specification and data are stated in the following tables.

The effective focal length of the lenses:

| Lenses | Effective focal length (mm) |
|---|---|
| $L_1$ | −52.61 |
| $L_2$ | −41.32 |
| $L_3$ | 57.83 |
| $C_3$ | 54.40 |
| $C_2$ | −317.26 |
| $C_3$ | −48.45 |
| $L_4$ | 36.11 |
| $L_5$ | 59.02 |

The refraction rate and abbe number of the lenses and the abbe number of the groups of lenses 10, 20, 30, 40:

| Lenses | Refraction rate | Abbe number |
|---|---|---|
| $L_1$ | 1.52 | 55.95 |
| $L_2$ | 1.49 | 81.59 |
| 10 | — | 137.5 |
| $L_3$ | 1.85 | 30.10 |
| 20 | — | 30.1 |
| $C_{11}$ | 1.81 | 25.50 |
| $C_{12}$ | 1.85 | 30.10 |
| 30 | — | 55.6 |
| $C_{21}$ | 1.76 | 27.50 |
| $C_{22}$ | 1.49 | 81.59 |
| $C_{31}$ | 1.65 | 33.80 |
| $C_{32}$ | 1.49 | 81.59 |
| $L_4$ | 1.49 | 81.59 |
| $L_5$ | 1.92 | 18.89 |
| 40 | — | 325.0 |

The radius, thickness, refraction rate and abbe number of each surface of the lenses:

| Surface no. | Radius (mm) | Thickness (mm) | Refraction rate | Abbe number |
|---|---|---|---|---|
| $1R_1$ | 13.21 | 3.00 | 1.52 | 55.95 |
| $1R_2$ | 8.23 | — | — | — |
| $2R_1$ | −468.35 | 1.00 | 1.49 | 81.59 |
| $2R_2$ | 21.49 | — | — | — |
| $3R_1$ | 49.16 | 2.94 | 1.85 | 30.10 |
| $3R_2$ | Infinity | — | — | — |
| $4R_1$ | 40.37 | 1.00 | 1.81 | 25.50 |
| $5R_1$ | 14.08 | 5.12 | 1.85 | 30.10 |
| $5R_2$ | 166.63 | — | — | — |
| S | Infinity | — | — | — |
| $6R_1$ | −596.38 | 1.00 | 1.76 | 27.50 |
| $7R_1$ | 13.49 | 4.33 | 1.49 | 81.59 |
| $7R_2$ | −30.50 | — | — | — |
| $8R_1$ | −13.92 | 1.00 | 1.65 | 33.80 |
| $9R_1$ | 42.44 | 5.01 | 1.49 | 81.59 |
| $9R_2$ | −20.12 | — | — | — |
| $10R_1$ | 49.27 | 5.58 | 1.49 | 81.59 |
| $10R_2$ | −27.16 | — | — | — |
| $11R_1$ | 43.12 | 3.02 | 1.92 | 18.89 |
| $11R_2$ | 200.15 | — | — | — |

The radius, conic value and order aspheric coefficient of the projecting surface $1R_1$ and the image inputting surface $1R_2$:

| Aspheric lens | $1R_1$ | $1R_2$ |
|---|---|---|
| Radius | 13.21 | 8.23 |
| Conic | −1.72 | −1.55 |
| 4th | −5.70E−05 | 1.70E−05 |
| 6th | 2.04E−07 | 2.29E−08 |
| 8th | −2.13E−10 | −2.55E−10 |
| 10th | −2.73E−13 | 8.19E−12 |
| 12th | 8.28E−16 | −4.12E−14 |
| 14th | −5.04E−19 | 6.47E−17 |

The distances $D_1$, $D_2$, $D_3$, $D_4$ between the groups of the lenses 10, 20, 30, 40 under different modes:

| Distance (mm) | Wide-angle mode | 1.1x | 1.2x | 1.3x | 1.4x | Telescope mode |
|---|---|---|---|---|---|---|
| $D_1$ | 37.48 | 31.64 | 27.02 | 23.39 | 20.57 | 18.41 |
| $D_2$ | 8.85 | 8.20 | 6.91 | 5.16 | 3.00 | 0.53 |
| $D_3$ | 4.26 | 5.32 | 6.55 | 7.92 | 9.39 | 10.94 |
| $D_4$ | 17.98 | 19.28 | 20.51 | 21.65 | 22.70 | 23.68 |

The effective focal lengths of each group of lenses at different zooming ratio:

| Groups of lenses | Wide-angle mode | 1.1x | 1.2x | 1.3x | 1.4x | 1.5x |
|---|---|---|---|---|---|---|
| 10 | −20.83 | −20.83 | −20.83 | −20.83 | −20.83 | −20.83 |
| 20 | 57.83 | 57.83 | 57.83 | 57.83 | 57.83 | 57.83 |
| 30 | 54.4 | 54.4 | 54.4 | 54.4 | 54.4 | 54.4 |
| 40 | 28.56 | 28.56 | 28.56 | 28.56 | 28.56 | 28.56 |
| 50B | 10.56 | 11.62 | 12.68 | 13.73 | 14.79 | 15.84 |
| zooming ratio | — | 1.0 | 1.2 | 1.3 | 1.4 | 1.5 |

Although particular embodiments of the invention have been described in detail for purposes of illustration, various modifications and enhancements may be made without departing from the spirit and scope of the invention. Accordingly, the invention is not to be limited except by the appended claims.

What is claimed is:

1. A projection lens structure, comprising:
a first group of lenses including at least a first lens and a second lens with a negative dioptric value, said first lens being a plastic aspheric lens in a meniscus shape with a focal length between −25~−80 mm;
a second group of lenses with a positive dioptric value, including at least a third lens;
a third group of lenses with a positive dioptric value, including at least a first doublet with a focal length between 25~80 mm; and
a fourth group of lenses with a negative dioptric value, including at least a group of doublets, a fourth lens and a fifth lens.

2. The projection lens structure as claimed in claim 1, wherein the fourth lens is a positive glass lens; the fifth lens is a positive glass lens; and the group of doublets includes at least one positive glass lens.

3. The projection lens structure as claimed in claim 1, wherein the group of doublets includes at least a second doublet and a third doublet, both doublets including at least one positive glass lens.

4. The projection lens structure as claimed in claim 3, wherein the third doublet has a focal length between −30~−60 mm.

5. The projection lens structure as claimed in claim 1, wherein the group of doublets includes at least one triplet lens with a focal length between −30~−40 mm and including at least two negative glass lenses.

6. The projection lens structure as claimed in claim 1, wherein the first group of lenses has an abbe number between 90-140; the second group of lenses has an abbe number between 25-55; the third group of lenses has an abbe number between 50-80; and the fourth group of lenses has an abbe number between 250-330 in total.

7. The projection lens structure as claimed in claim 1, wherein the structure further includes an aperture stop disposed between the third and the fourth group of lenses with an f-number between 1.6~2.0.

8. The projection lens structure as claimed in claim 1, wherein the structure conforms to the following prerequisite factors:

$$-2.0 > \frac{fla}{fw} < -1.1;$$

$$2.0 > \frac{f4}{fw} < 3.2;$$

$$1.48 < \frac{Bf}{fw} < 1.71;$$

where
fla is an effective focal length of the first group of lenses;
fw is an focal length of the projection system structure under wide-angle mode;
f4 is an effective focal length of the fourth group of lenses; and
Bf is an air-conversion length of back-focus of the projection system structure.

9. The projection lens structure as claimed in claim 1, wherein the projection system structure is convertible between wide-angle mode and telescope mode and the first group of lenses arranged as the focusing lenses for the groups of lenses to operate focusing by a digital mirror device, when in wide-angle mode, the first and second groups of lenses being far from the digital mirror device and the third and fourth groups of lenses being close to the digital mirror device, when in telescope mode, the first and second groups of lenses being close to the digital mirror device and the third and fourth groups of lenses being far from the digital mirror device.

10. The projection lens structure as claimed in claim 1, wherein the projection system structure has a zoom ratio of 1.0×-1.5×.

* * * * *